United States Patent [19]

Van Ryswyk et al.

[11] 3,755,749

[45] Aug. 28, 1973

[54] SOUND REENFORCEMENT EQUALIZATION SYSTEM

[75] Inventors: Carl Wayne Van Ryswyk; Charles Paul Boner, both of Austin, Tex.

[73] Assignee: White Instruments, Incorporated, Austin, Tex.

[22] Filed: Nov. 22, 1971

[21] Appl. No.: 200,785

[52] U.S. Cl. ................ 328/167, 328/127, 179/1 FS
[51] Int. Cl. .......................... H03b 1/04, H04b 1/10
[58] Field of Search ............................ 328/167, 127; 179/1 FS

[56] References Cited

UNITED STATES PATENTS

| | | | |
|---|---|---|---|
| 3,628,057 | 12/1971 | Mueller | 328/167 X |
| 3,665,321 | 5/1972 | Michnik | 328/167 X |
| 3,673,503 | 6/1972 | Parker | 328/167 |
| 3,678,416 | 7/1972 | Burwen | 328/167 X |

*Primary Examiner*—john S. Heyman
*Attorney*—John S. Lacey

[57] ABSTRACT

An active filter in combination with a sound reenforcement equalization system is provided. The filter permits variation of the notch frequency over a wide range of frequencies and adjustment of the notch depth from zero to any desired value independent of frequency control. Active filters may be cascaded without additional loss in the pass band.

9 Claims, 8 Drawing Figures

SOUND REENFORCEMENT EQUALIZATION SYSTEM

SUMMARY OF THE INVENTION

The present invention relates generally to sound reenforcing equalization systems of the general type shown in U.S. Pat. No. 3,256,391, dated June 14, 1966, Charles Paul Boner, Inventor. More particularly, the invention relates to a sound reenforcement equalization system which employs an active filter rather than a passive filter as shown in the Boner patent.

One object of the invention is to provide a sound reenforcement equalization system wherein the output from an active band-pass filter, with the phase inverted, is summed with the output from a mixer amplifier to produce a notch response which is variable over a wide range of frequencies.

Another object of the invention is to provide a sound reenforcement system employing means for adjusting notch depth from zero to any desired value, the means being independent of frequency control.

As a further object, the invention provides a sound reenforcement system in which active band-pass filter units may be connected in cascade without additional loss in the pass band.

A further object of the invention resides in the provision, in a sound reenforcing system, of an active filter which may be designed for broad-band equalization to permit preliminary adjustment of the system, or with a very sharp response for equalization at specific frequencies to correct feedback and ringing problems.

Still another object of the invention is to provide a sound reenforcement equalization system which employs an active filter that, in a modified embodiment, not only permits the audio system response to be notched at troublesome frequencies but also to be peaked at the desired frequency as well.

And still another object of the invention is to provide a sound reenforcing system which does not require the use of large cumbersome inductors such as must be employed in passive filter systems.

Other objects of the invention will appear as the description thereof proceeds.

DETAILED DESCRIPTION OF THE INVENTION

Briefly, the present invention comprises a sound reenforcing system which utilizes an active filter and amplifier unit which is connected between the usual line amplifier or mixer amplifier and the power amplifier. The advantages of an active filter over a passive one such as is shown in, say, the Boner patent above referenced are that the notch frequency and notch depth are readily and quickly adjustable, and active filters may be connected in multiple, or cascade, without additional loss in the pass band. In a modified embodiment the filter may be used for one-third octave equalization.

The active filter and amplifier unit consists of a band-pass section including a pair of integrating amplifiers, and an output amplifier section. The phasing of the band-pass section is such that if a portion of its voltage is summed with the input signal from the mixer amplifier, a notch response will result which will be at the minimum at the center of the pass band. As stated hereinabove, the filter may be adjusted for frequency and notch depth as required.

In the modifications designed for broad-band equalization additional flexibility is provided in that not only can the response of the audio system be notched at troublesome frequencies but peaking of the system can also be effected. In one modification the filter unit employs a phase splitter followed by a band-pass filter unit whose output is 180° out of phase with its input. The output of the band-pass filter and the input to the phase splitter are summed and passed through an output amplifier. When the output of the band-pass filter at its center frequency is in reverse phase with the input to the phase splitter, the output of the filter unit will have a notch at that frequency. If the output of the band-pass filter is in phase with the input to the phase splitter, the output of the filter unit will have a peak in its response at the center frequency of the band-pass filter.

In the other modification a filter unit comprising a band-pass filter and an add-subtract circuit are used. When the output of the band-pass filter is summed with the input signal from the driver amplifier the response of the filter unit will produce a notch at the center frequency of the band-pass filter; when the output of the band-pass filter is subtracted from the input, i.e., from the output of the driver amplifier, the response will have a peak at the center frequency of said filter.

Figure 1:
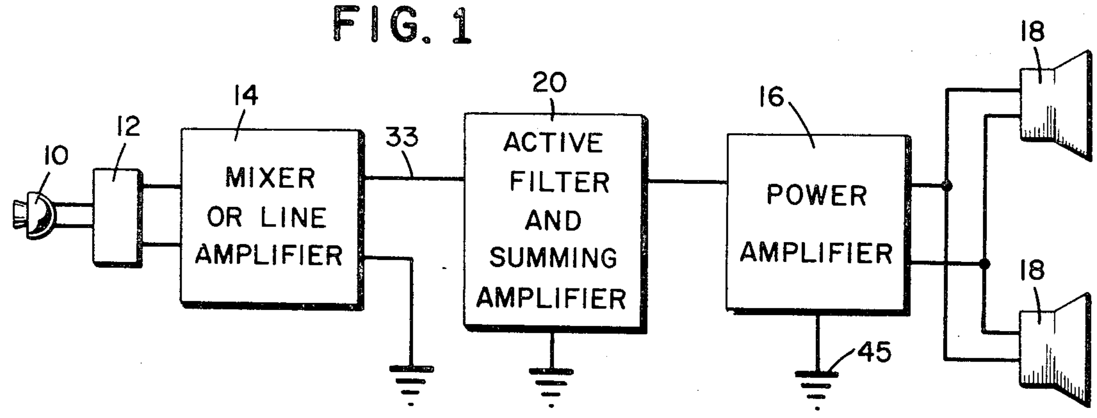
FIG. 1 is a block diagram of the invention.

Referring to the drawings in more detail and first to FIG. 1 thereof, the sound reenforcing equalization system of the present invention comprises a plurality of microphones, one of which is shown at 10, a preamplifier 12 connected to the microphones, a line amplifier or mixer amplifier 14, a power amplifier 16 and a plurality of loudspeakers 18 connected to the power amplifier. Connected between the line amplifier or mixer amplifier 14 and the power amplifier 16 is an active filter unit 20, which will be described in detail hereinafter.

Figure 2:
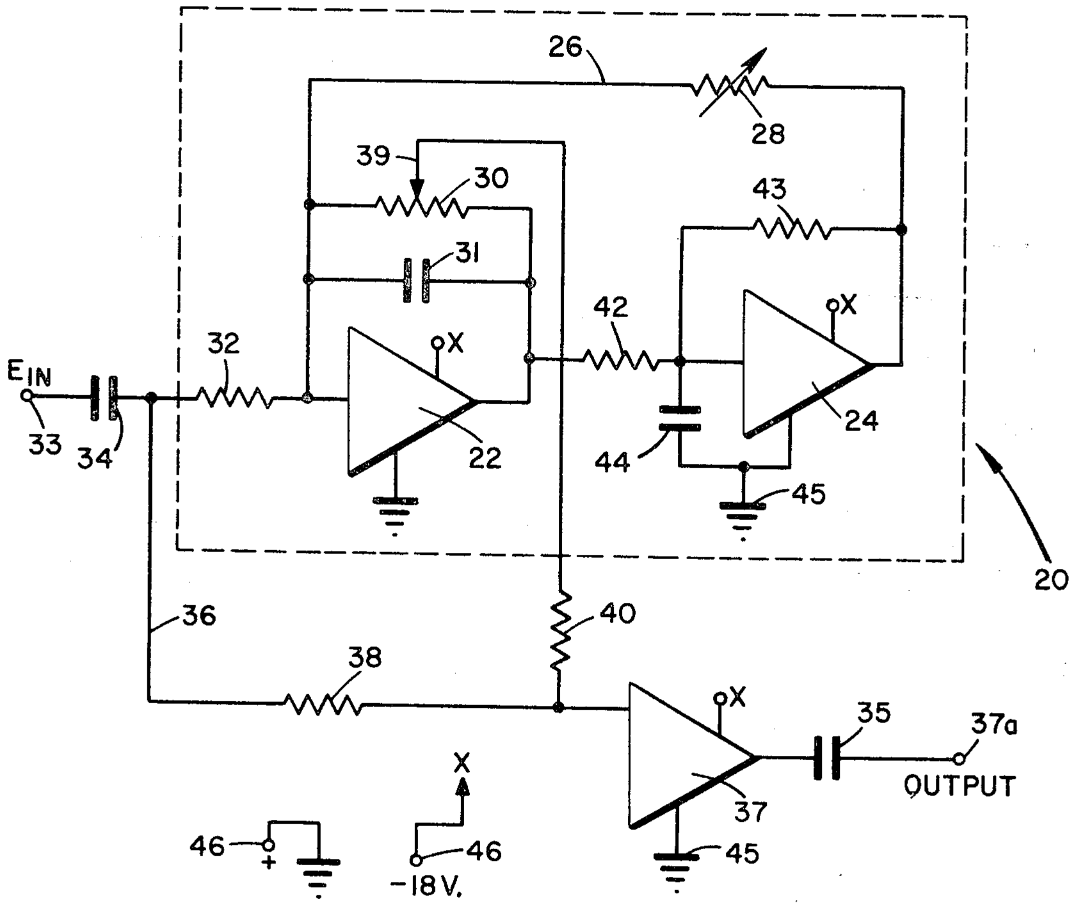
FIG. 2 is a circuit schematic showing the active filter employed, according to one embodiment of the invention.

The active filter unit 20, according to one embodiment of the invention, is shown in FIG. 2 of the drawings. In this view the band-pass circuitry per se is contained within the rectangular broken line and includes integrators 22 and 24, in the form of operational amplifiers, which are connected in a feedback arrangement by a conductor 26 and a variable resistor (rheostat) 28. The integrator 22 is an inverting integrator whereas the integrator 24 is a non-inverting integrator. This configuration, sometimes called a Biquad Network, is described in a paper titled "The Biquad: A Multipurpose Active Filtering System," by Lee C. Thomas, Bell Telephone Laboratories, Inc. (1969). (Later published as: "The Biquad," Lee C. Thomas, Trans. on Circuit Theory, May 1971, Vol. CT–18, No. 3, of Inst. of Electrical and Electronic Engineers.)

Local feedback in the integrator 22 is effected by a potentiometer 30 and a capacitor 31, connected in parallel across said integrator. An input resistor 32 is connected between an input terminal 33 and the integrator 22, the terminal 33 being connected to the output of the mixer amplifier 14. If an unbalanced (single-ended) power supply is used, a coupling capacitor 34 is connected between the input terminal 33 and the filter circuitry; similarly, a coupling capacitor 35 is connected at the output of the filter. If a balanced power supply is used, the capacitors 34 and 35 may be omitted.

A conductor 36 is connected between the junction of the capacitor 34 and the resistor 32 (or if said capacitor 34 is omitted, to the terminal 33) and the input of a summing output amplifier 37, through a resistor 38. The arm of the potentiometer 30, shown at 39, is connected to the input of said amplifier 37 through a resistor 40. The output of the amplifier 37 is connected to an output terminal 37*a*, either directly or through the capacitor 35 if said capacitor is used.

The non-inverting integrator 24 is connected to the integrator 22 through an input resistor 42. A resistor 43 and capacitor 44 and ground 45 are connected in a local feedback loop, the main feedback loop for the integrators 22 and 24 being provided by the conductor 26 and the rheostat 28, as described hereinabove.

Power is supplied to the integrators 22 and 24 and the summing amplifier 37 at the points indicated at X from terminals 46.

The output from the band-pass circuit is taken from the integrator 22 at the potentiometer arm 39 and subtracted from the input at the summing amplifier 37 to provide a notch response at the desired frequency. Subtraction of the two voltages is accomplished by adding together the filter output to the input signal. (The filter output at the potentiometer arm 39 is 180° out of phase with the voltage input at the terminal 33 at the filter center frequency.) The gain of the summing amplifier 37 compensates for the loss that takes place during the summing process. Thus the filter and amplifier unit 20 produces a voltage equal to 1 at frequencies away from the notch frequency. The design constants for the center frequency and bandwidth are as follows:

Center frequency $f_o = 1/2\pi \sqrt{2/RR_1C_1C_2}$

Bandwidth $\Delta f = (1/R_4C_12\pi)$

Where:

$R$ is the value of the resistors 42 and 43

$R_1$ is the value of the resistor 28

$C_1$ is the value of the capacitor 31

$C_2$ is the value of the capacitor 44

$R_4$ is the value of the potentiometer 30

Typical values of the components, for a narrow band (on the order of 10 Hz) active filter, are as follows:

| | |
|---|---|
| capacitor 31 = | 0.022 Mfd |
| capacitor 34 = | 0.22 Mfd |
| capacitor 35 = | 10 Mfd |
| capacitor 44 = | 0.022 Mfd |
| variable resistor 28 = | 27 K ohms |
| potentiometer 30 = | 100 K ohms |
| resistor 32 = | 316 K ohms |
| resistor 38 = | 1 megohm |
| resistor 40 = | 649 K ohms |
| resistor 42 = | 4.35 K ohms |
| resistor 43 = | 4.35 K ohms |

Capacitors 31 and 44 and the resistors 28, 42 and 43 are the components which set the center frequency of the band pass filter. As the value of the resistor 28 is varied, the frequency changes by the square root of the value of said resistor 28. The values of resistors 30 and 32 are chosen so that the output signal at the potentiometer arm 39 will be approximately one-third of the input signal. These two components set the forward gain of the band pass filter. The potentiometer 30 permits variation of the signal amplitude to change the depth of the response null. The values of resistor 38 and the resistor 40, which act as summing resistors, are chosen to produce the desired null depth for maximum signal output at the arm 39. The gain 37 is set to produce unity gain transmission in the pass band.

The component values listed hereinabove are for a frequency range of from 1000 Hz to 3000 Hz. Other component values may be used to construct filters that will cover the remainder of the audio band. If a broader band active filter is desired, the potentiometer 30 must have a lower value, to widen the notch. The resistor 32 would also have to have a lower value, i.e., lowered the same amount as the potentiometer 30, to maintain the voltage transmission of the filter the same as for the narrow band filter.

Figure 3:
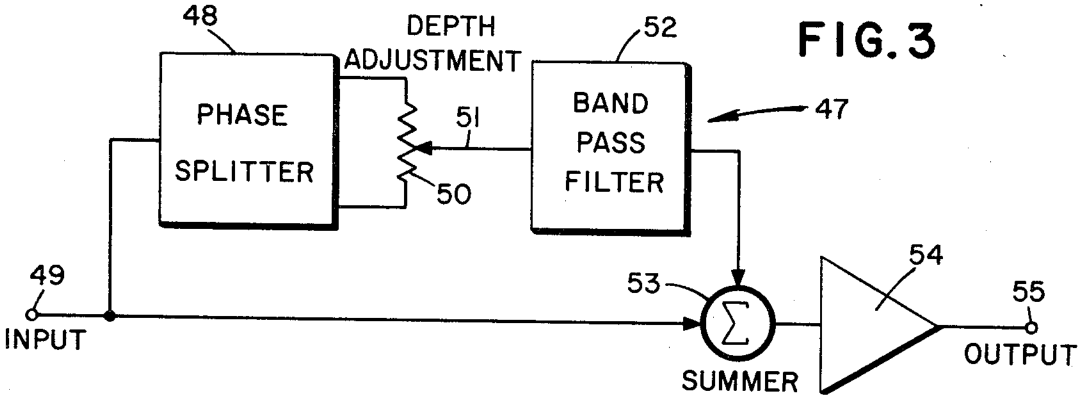
FIG. 3 is a block diagram showing a modified embodiment of the active filter.

A modified form of active filter with increased capabilities, for broad band equalization, is shown at 47 in FIG. 3. The modified filter of FIG. 3 provides additional flexibility in the equalization process because it not only permits the audio system response to be notched at troublesome frequencies, but also allows the system to peak. A typical range of continuous adjustment with the modified filter is from a 10 dB notch to a 10 dB peak at the desired frequency.

The modified filter 47 of FIG. 3 is designed for ⅓ octave spacings in frequency and has continuously adjustable amplitude characteristics and a fixed frequency. It comprises a phase splitter 48 having its input connected to an input terminal 49 and its output connected to the element of a potentiometer 50, the arm 51 of said potentiometer being connected to the input of an active band pass filter unit 52. The output of the filter unit 52 and the input terminal 49 are connected to a summer 53, and the output of the summer is connected to an output amplifier 54. The output of the amplifier 54 is connected to an output terminal 55. As will be understood, the input and output terminals 49 and 55 correspond to the input and output terminals 33 and 37a, respectively, of the active filter shown in FIG. 2.

In the filter 47 of FIG. 3 the filter characteristics are generated by the phase splitter 48 followed by the filter unit 52 the output of which is 180° out of phase with its input. The output of the filter unit 52 and the phase splitter input are summed together in the summer 53 and the sum is conducted to the amplifier 54 and thence to the output terminal 55. As in the first described embodiment of the invention, the input to the modified filter unit, i.e., the terminal 49, is connected to the mixer amplifier 14 and the output, i.e., the terminal 55, is connected to the power amplifier 16.

When the output of the filter unit 52 at its center frequency is out of phase with the input to the phase splitter 48, the output of the filter 47 will have a notch at that frequency. If the output of the filter unit 52 is in phase with the input to the phase splitter, the output of the filter 47 will have a peak in response at the center frequency of the filter unit 52. That is, peaking in the subtraction mode and notching in the summation mode occurs because the filter unit output is 180° out of phase with the input thereto.

The filter unit 52 used in the modification of FIG. 3 may be of the same type as shown in FIG. 2 or it may be of a different design. Similarly, the phase splitter 48 may be one of several different, well-known types.

Figure 4:
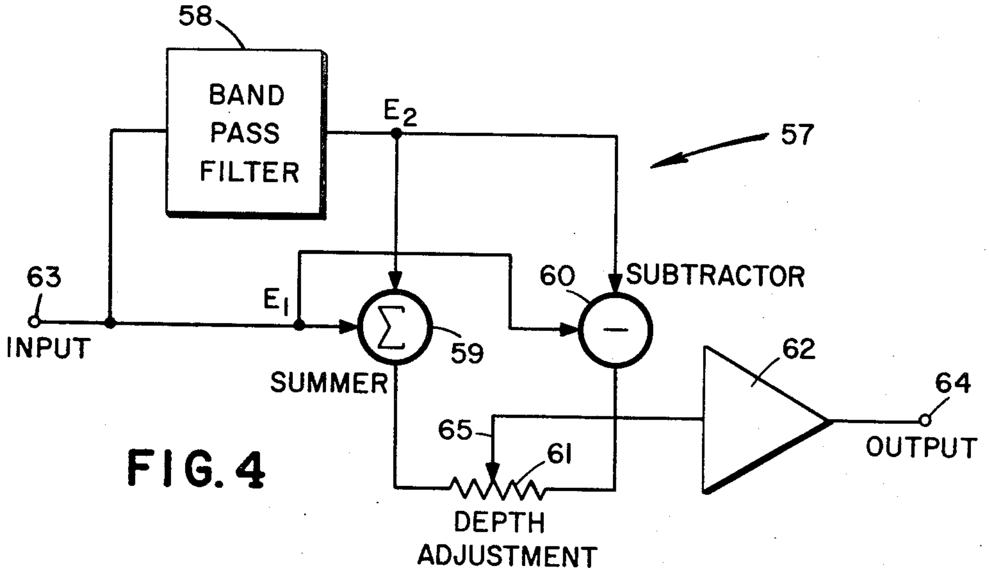
FIG. 4 is a block diagram showing another active filter modification.

Another modified form of active filter is shown at 57 in FIG. 4. The filter 57 includes a filter unit 58, a summer 59, a subtractor 60, a depth adjustment potentiometer 61, an output amplifier 62 and input and output terminals 63 and 64, respectively. As in the previously described embodiments of the invention, the input terminal 63 is connected to the mixer amplifier 14 and the output terminal 64 is connected to the power amplifier 16.

As will be seen in FIG. 4, the input terminal 63 is connected to the input of the filter unit 58 and to input terminals on the summer 59 and subtractor 60. Second input terminals on the summer and subtractor are connected to the output of the filter unit 58. Output terminals of the summer and subtractor are connected to the end terminals of the element of the potentiometer 61, and the output of the filter 57 is taken from the arm of the potentiometer 61, said arm being indicated at 65. The arm 65 is connected to the output terminal 64 through the output amplifier 62.

In the embodiment of FIG. 4, when the output of the filter unit 58 is summed with the input signal, the filter 57 will have a notch at the center frequency of said unit 58, and when the filter unit 58 is subtracted from the input, the filter 57 will have a peak at the center frequency of said unit 58.

For the sake of clarity in this description it should be understood that in the embodiment shown in FIG. 3 the word "filter" means all of the associated components, i.e., the phase splitter 48, the potentiometer 50, the filter unit 52, the summer 53, and the amplifier 54, whereas the words "filter unit" mean the band pass filter unit per se, e.g., the filter unit 52 which may take the form shown within the broken line rectangle in FIG. 2. Similarly, in the description of FIG. 4, "filter" means the filter unit 58, the summer 59, the potentiometer 61, the subtractor 60, and the amplifier 62; "filter unit" means the unit 58.

Figure 5:
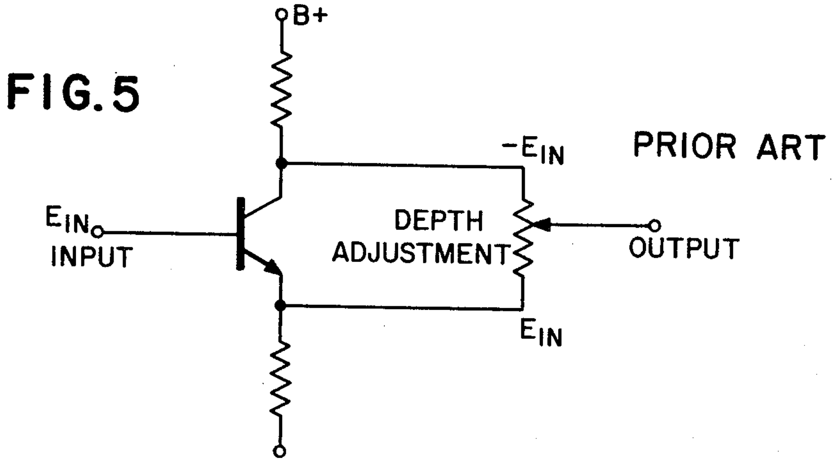
FIG. 5 is a circuit schematic showing a transistor-type phase splitter for use in the active filter modification of FIG. 3.
Figure 6:
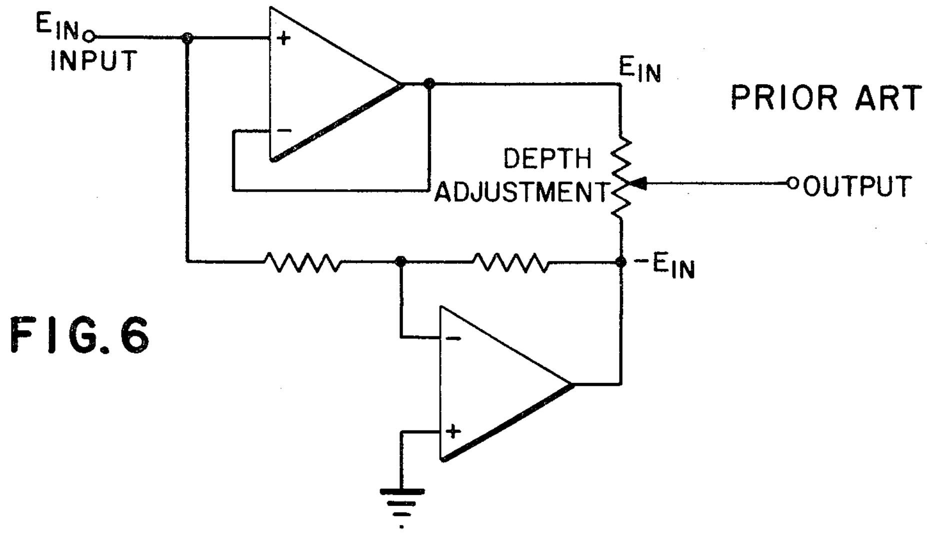
FIG. 6 is a circuit schematic showing a phase splitter using two operational amplifiers with a common input.
Figure 7:
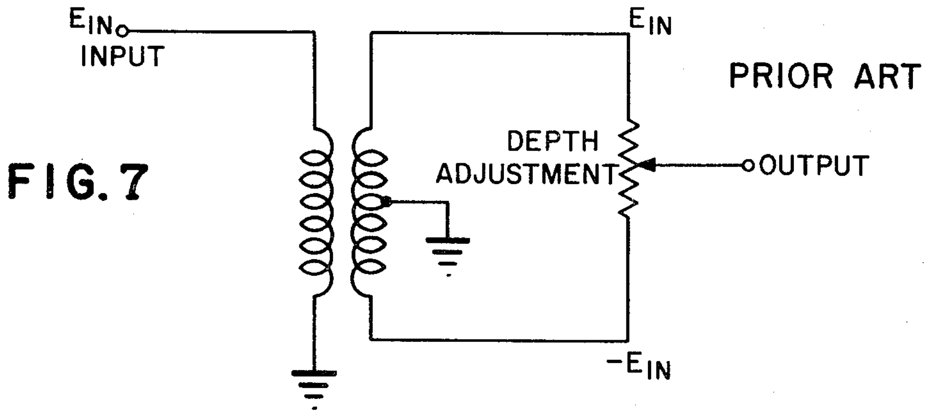
FIG. 7 is a schematic view showing a phase splitter using a transformer.
Figure 8:
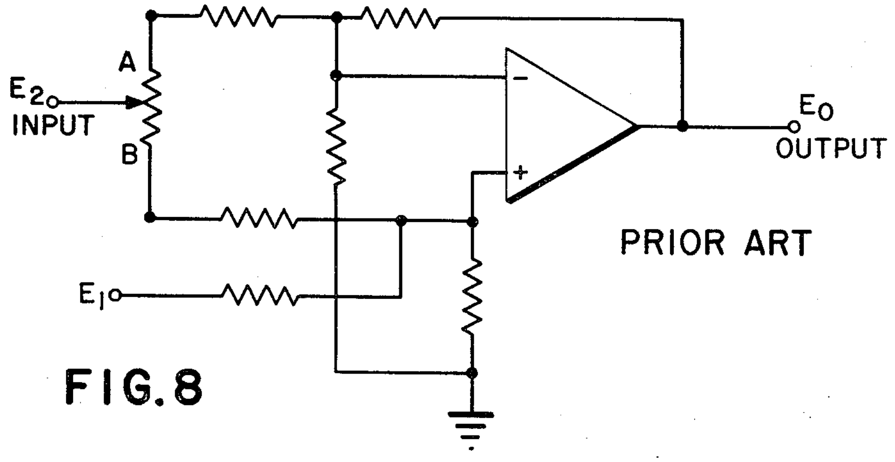
FIG. 8 is a schematic view showing an adder-subtractor circuit for use with the active filter modification shown in FIG. 4.

The phase splitter 48 of FIG. 3 and the adder-subtractor 59–60 of FIG 4 can be built by using any of several well-known circuits. Accordingly, it is not considered necessary to describe such circuits in detail. Typical phase splitter circuits are shown in FIGS. 5, 6 and 7 and a common type of adder-subtractor is shown in FIG. 8. In FIG. 5 the phase splitter is a transistor with outputs taken from both the emitter and the collector.

In FIG. 6 phase splitting is accomplished by using two operational amplifiers with a common input. One amplifier is connected as a unity gain amplifier with no phase reversal and the other amplifier is connected as a unity gain inverting amplifier. In FIG. 7 a transformer is used to effect phase splitting.

Filters made according to the circuits of FIGS. 3 and 4 have unity gain at each side of the center frequency and several can be connected in cascade in an audio system to provide versatility in equalizing audio responses without causing losses in the system that in other arrangements would have to be compensated for by additional amplifiers.

The filters of FIGS. 3 and 4 may be designed for broad-band response, e.g., ⅓ octave, and used in general response shaping, or they may be made with very sharp response (on the order of 10 Hz) for equalization at frequencies at which feedback and ringing problems appear. Feedback and ringing occur at essentially single frequencies with harmonics, rather than in continuous bands of frequencies.

We claim:

1. In a sound reenforcement equalization system having a mixer amplifier and a power amplifier, a filter connected between the mixer amplifier and the power amplifier and comprising a filter unit including a pair of integrating amplifiers, means for summing a portion of the output of the filter unit with an input signal from the mixer amplifier to produce a notch response, and means connected with the integrating amplifiers for adjusting the filter for frequency response and notch depth, said filter comprising a filter unit and an adder-subtractor circuit, said filter unit comprising a first integrating amplifier, a second integrating amplifier and feedback means connecting the output of the second integrating amplifier with the input of the first integrating amplifier, said adder-subtractor circuit being connected to the output of the first integrating amplifier.

2. A sound reenforcement equalization system as recited in claim 1, including additionally an output amplifier connected to the summing means.

3. A sound reenforcement equalization system as recited in claim 2, wherein said summing means includes a potentiometer and a resistor connected between one of the integrating amplifiers and said output amplifier.

4. A sound reenforcement equalization system as recited in claim 1, wherein said frequency response adjusting means comprises a variable resistor connected between the output of one of the integrating amplifiers and the input of the other of said integrating amplifiers.

5. A sound reenforcement equalization system as recited in claim 1, wherein said notch depth adjusting means includes a potentiometer connected to one of said integrating amplifiers.

6. A sound reenforcement equalization system as recited in claim 1, wherein said filter comprises a phase splitter and a filter unit, said filter unit comprising a pair of integrating amplifiers.

7. A sound reenforcement equalization system including, in combination with a mixer amplifier and a power amplifier, an active band-pass filter connected between the mixer amplifier and the power amplifier, said filter including a filter unit comprising a pair of integrating amplifiers and feedback means connecting the output of one of said integrating amplifiers with the input of the other, and a summing output amplifier connected to the filter unit input and to one of said integrating amplifiers.

8. A sound reenforcement equalization system including, in combination with a mixer amplifier and a power amplifier, a filter connected between the mixer amplifier and the power amplifier, said filter comprising a first integrating amplifier having its input connected to the mixer amplifier, a second integrating amplifier, feedback means connecting the output of the second integrating amplifier with the input of the first integrating amplifier and output means connected to the first integrating amplifier, summing means connected to said filter output means, an output terminal, and an output amplifier having its input connected to the summing means and to the input terminal and its output connected to the output terminal.

9. The combination recited in claim 8, wherein the filter output means is adjustable for producing a variable notch response, and wherein the filter feedback means is adjustable for varying the frequency response.

* * * * *